United States Patent Office 3,178,300
Patented Apr. 13, 1965

3,178,300
SKELETAL POLYURETHANE FOAM AND
METHOD OF MAKING SAME
Paul G. Gemeinhardt, Pittsburgh, Pa., and Stanley A. Bingham, Cuyahoga Falls, Ohio, assignors to Mobay Chemical Company, Pittsburgh, Pa., a corporation of Delaware
No Drawing. Filed Apr. 6, 1964, Ser. No. 357,775
20 Claims. (Cl. 106—122)

This invention relates to polyurethane plastics and more particularly to skeletal cellular polyurethane plastics. This application is a continuation-in-part of our copending application Serial No. 90,918, now abandoned.

The cellular polyurethane plastics heretofore available are, generally speaking, of three types, (1) those having closed cells, (2) those having open cells and (3) those having only the skeleton of the original structure. The so-called closed-cell cellular polyurethane has very few of its cells ruptured. The so-called open-cell cellular polyurethane has most of its cells ruptured and most of the filmy cell faces are still present. Skeletal cellular polyurethanes have had the filmy cell faces almost completely removed, leaving only the skeleton of the original cellular structure.

The preparation of the skeletal type of cellular polyurethane is the subject of Belgium Patent 543,362 but involves the expensive method of post-treating the cellular polyurethane to remove from 10 percent to 50 percent by weight of the original product.

A method of preparing a foamed polyurethane filler is proposed in U.S. Patent 2,961,710 but this method also involves expensive post-treatment of the already prepared cellular polyurethane by mechanically agitating the foam to open the cells and then flushing with oil to remove the particles.

Skeletal-cellular polyurethane plastics have been slow in achieving commercial success because of this waste of materials involved in producing the skeletal structure and mainly because of the expense of the added processing steps. There have been no formulations available heretofore for the direct production of the skeletal structure without post-treatment.

It is therefore an object of this invention to provide an improved method of making skeletal cellular polyurethane plastics which does not waste material or require expensive post-treatment. Another object of this invention is to provide additives which will promote the formation of skeletal cellular polyurethane plastics suitable for use as a filter. Still another object of this invention is to provide a novel method of removing the cell faces and forming heavy ribs or stalks without collapse of the cellular structure in the preparation of polyurethane foam. Another object of the invention is to provide improved skeletal cellular polyurethane plastics.

The foregoing objects and others which will become apparent from the following description are accomplished in accordance with the invention, generally speaking, by providing skeletal cellular polyurethane plastics and a method of making skeletal cellular polyurethane plastics which comprises mixing an organic polyisocyanate with castor oil in the presence of an alkyl silane oxyalkylene block copolymer, a blowing agent and from about 5 to about 40 parts per hundred parts of castor oil of an organic compound which contains only one free hydroxyl group. Therefore, this invention contemplates an improved method for making skeletal cellular polyurethane plastics which does not waste any of the expensive raw materials which go into the product. The initial product has the skeletal structure without any subsequent treatment of the already prepared cellular polyurethane plastic to remove cell faces. The invention provides for the preparation of skeletal cellular polyurethane plastics in a simple method using chemical additives which will allow the formation of cell faces during the time of gas evolution and polymer formations so that an expanded cellular polyurethane product is formed. At the time of maximum gas evolution, the cell faces are still fluid enough to rupture and run back into the rib or stalk and consequently are essentially not present in the final product.

This phenomenon has not been completely explained but is caused to using a combination of about 100 parts of castor oil in conjunction with from about 5 to 40 parts of an organic compound which contains only one hydroxyl group and preferably a monohydric alcohol and/or monocarboxylic acid. The monohydric alcohol or monocarboxylic acid may function in this system as a chain stopper to react at exactly the proper time to inhibit the formation of the polymer so that the cell faces remain fluid long enough to be drawn back into the rib or stalk of the foam structure, although this has not been definitely established. It was not to be expected that one could prepare a cellular product using the cell faces to form a cellular structure but which would have practically no cell faces remaining after the product had risen to its maximum height and then cured.

Any suitable compound containing only one hydroxyl group may be used in the process of this invention but it is preferred to use those compounds which have the formula

R—OH wherein R is an organic radical obtained by removing the hydroxyl group from a monohydric alcohol or a monocarboxylic acid. The hydroxyl group in these compounds is the sole active hydrogen containing group attached to said organic radical, R. In other words, R may be substituted with halogen, nitro, alkoxy, phosphato and the like but may not have another active hydrogen containing group such as —NH$_2$, —NH— and the like. Furthermore, it is to be understood that the term "hydroxyl group" as used both in the specification and the claims refers to both alcoholic hydroxyl groups and to the hydroxyl group, —OH, present in a carboxyl radical, —COOH. Suitable compounds of this type include alcohols containing from 1 to 18 carbon atoms such as methyl alcohol, ethyl alcohol, n-propyl alcohol, isopropyl alcohol, n-butyl alcohol, isobutyl alcohol, sec-butyl alcohol, t-butyl alcohol, n-amyl alcohol, 1-methyl-butyl alcohol, 2-methyl-butyl alcohol, 3-methyl-butyl alcohol, 1,1-dimethylpropyl alcohol, 1,2-dimethylpropyl alcohol, 2,2-dimethylpropyl alcohol, 1-ethylpropyl alcohol, hexyl alcohol, heptyl alcohol, octyl alcohol, nonyl alcohol, decyl alcohol, undecyl alcohol, dodecyl alcohol, tridecyl alcohol, tetradecyl alcohol, pentadecyl alcohol, hexadecyl alcohol, heptadecyl alcohol, octadecyl alcohol, benzyl alcohol, beta-hydroxy ethyl benzene, ethyl ether of diethylene glycol, 2-chloro amyl alcohol, 2-chloro hexyl alcohol and the like.

Any suitable monocarboxylic acid may be used but it is preferred to use those containing from 2 to 18 carbon atoms including acetic acid, oleic acid, propionic acid, butyric acid, valeric acid, caproic acid, enanthic acid, caprylic acid, pelargonic acid, capric acid, hendecanoic acid, lauric acid, tridecanoic acid, myristic acid, pentadecanoic acid, palmitic acid, margaric acid, stearic acid, nonadecanoic acid, benzoic acid, o-chloro benzoic acid, m-toluic acid and the like.

A particularly preferred mixture of acids and non-acid bodies which has proven to give the best results and which also has the advantage of being a very economical material is tall oil.

The term "tall oil" as used herein and in the claims designates the resinous substances obtained as a waste product in the manufacture of cellulose from pine wood. The composition of the tall oil and its properties are preferably within approximately the following ranges:

| | |
|---|---|
| Density | 0.95–1.02 |
| Acid number | 107–200 |
| Ash _____percent__ | 0.1–4.6 |
| Moisture _____do____ | 0.1–1.0 |
| Insoluble (petroleum ether) _____do____ | 0.1–8.5 |
| Fatty acids _____do____ | 18–99 |
| Resin acids _____do____ | 0.5–80 |
| Nonacid bodies _____do____ | 0.1–24 |
| Viscosity: | |
| At 18° C. _____cp__ | 760–15×10$^6$ |
| At 100° C. _____cts__ | 150–1200 |

The composition of the tall oil used in the process of this invention may vary a great deal. Best results have been obtained so far through the use of a fine grade of tall oil which has the following composition:

| | |
|---|---|
| Rosin acids, percent | 0.5 |
| Fatty acids, percent | 99.0 |
| Unsaponifiables, percent | 0.5 |
| Saturated acids, percent | 2.2 |
| Acid number | 199 |
| Saponification number | 199 |
| Iodine number | 134 |

Any suitable organic polyisocyanate may be used in the process of the present invention including aromatic, aliphatic and heterocyclic polyisocyanates. In other words, two or more isocyanate radicals may be bonded to any suitable divalent or higher polyvalent organic radical to produce the organic polyisocyanates which are useful in accordance with the present invention including acyclic, alicyclic, aromatic and heterocyclic radicals. Suitable organic polyisocyanates are, therefore, ethylene diisocyanate, ethylidene diisocyanate, propylene-1,2-diisocyanate, cyclohexylene-1,2-diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-diphenylene diisocyanate, 3,3'-diphenyl-4,4'-biphenylene diisocyanate, 4,4'-biphenylene diisocyanate, 3,3'-dichloro-4,4'-biphenylene diisocyanate, p,p',p''-triphenylmethane triisocyanate, 1,5-naphthalene diisocyanate, furfurylidene diisocyanate, or polyisocyanates in a blocked or inactive form such as the bis-phenyl carbamates of 2,4- or 2,6-toluylene diisocyanate, p,p'-diphenylmethane diisocyanate, p-phenylene diisocyanate, 1,5-naphthalene diisocyanate and the like. It is preferred to use the commercially available mixture of toluylene diisocyanates which contains 80 percent 2,4-toluylene diisocyanate and 20 percent 2,6-toluylene diisocyanate or 4,4'-diphenylmethane diisocyanate.

Any suitable alkyl silane oxyalkylene block copolymer may be used but those disclosed in U.S. Patent 2,834,748 and having the following formula are preferred:

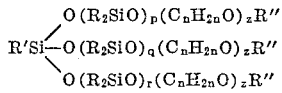

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units and $z$ is equal to from about 26 to about 34. Most preferred is a compound having the formula:

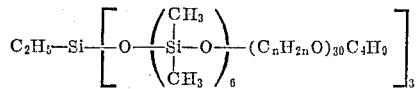

wherein $(C_nH_{2n}O)$ is a mixed polyoxyethylene and oxypropylene block copolymer containing about 17 oxyethylene units and about 13 oxypropylene units.

It is preferred to include a catalyst in the reaction mixture leading to the production of the cellular polyurethane plastics. Suitable catalysts are, for example, tertiary amines, such as for example, triethylene diamine, N-methyl morpholine, N-ethyl morpholine, diethyl ethanolamine, N-coco morpholine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine and the like. Other suitable catalysts are, for example, tin compounds such as stannous chloride, tin salts of carboxylic acids such as dibutyl tin di-2-ethyl hexoate, tin alcoholates such as stannous octoate, stannous oleate and the like as well as other organo metallic compounds such as are disclosed in U.S. Patent 2,846,408 and in copending application Serial No. 835,450.

The process of the invention may be carried out in a relatively straightforward and convenient manner preferably using a machine mixer such as that described in U.S. Reissue Patent 24,514. The relative amounts of castor oil and monohydroxy compound can be varied from about 5 to about 40 parts of the additive per hundred parts of castor oil. Preferably 5 to 15 parts of the monohydroxy compound, the best results being obtained when using tall oil containing at least about 90% fatty acids, are used per hundred parts of castor oil. A particularly preferred system is based on 100 parts castor oil, 5 to 15 parts tall oil, 3 to 4.5 parts water, 0.2 to 15 parts of the alkyl silane oxyalkylene block copolymer, about 45 to 75 parts of toluylene diisocyanate, about 0.2 to about 1.5 parts of stannous octoate or stannous oleate and about 0.3 to 1.2 parts of triethylene diamine, the parts being by weight. The amount of toluylene diisocyanate is preferably 90 percent to 110 percent by weight of the total of 10 times the weight of water plus the weight required to react with all of the active hydrogen in the formulation. The term "active hydrogen" is understood to mean hydrogen atoms which are reactive with an —NCO group. It is possible to use either the so-called "one-shot" process where all of the reactive components are mixed in one step or one may proceed by the prepolymer process wherein the organic polyisocyanate is prereacted with the castor oil to make a prepolymer having free —NCO groups which is then reacted with water to prepare the cellular polyurethane.

It is often advantageous to include other additives in the reaction mixture such as, for example, coloring agents, fillers, emulsifiers and the like.

It is preferred to include the organic compound containing one free hydroxyl group in the castor oil and then mix the blend with an organic polyisocyanate and a blowing agent. Water will react with the organic polyisocyanate and act as the blowing agent for the system or in the alternative one may use a blowing agent such as a halohydrocarbon for example, dichlorodifluoromethane, trichlorofluoromethane, nitroso compounds such as N,N'-dinitrosopentamethylene tetramine, azo compounds such as diazoaminobenzene, 1,3-diphenyl triazene, azo dicarbonamide, 1,1'-azo-bis-formamide, 2,2'-azo-isobutyronitrile, azo-hexahydrobenzonitrile and the like.

The products of this invention are useful for the preparation of filters and thus may be used for the removal of solids entrained in almost any fluid. They are particularly useful as air filters in refrigerators, heating equipment, air conditioners and the like. The foamed polyurethane may be made into a filter by cutting it into the desired shape. Any surface skin formed during the foaming operation should be removed since this may interfere with the filtering capacity of the foamed polyurethane.

The invention is further illustrated by the following examples in which parts are by weight unless otherwise indicated.

The air transmission data given in the following examples is the result of tests conducted on a "FRAM" tester calibrated to draw 350 cu. ft. of air per minute through a six inch diameter aperture. The pressure drop across a given thickness is measured in inches of water. In order to be classified as a skeletal cellular polyurethane plastic the pressure drop across a ⅜ inch thickness of cellular polyurethane plastic must not be more than about 0.5 inch of water at an air volume of 350 ft. ³/minute.

*Example 1*

About 90 parts of castor oil having an hydroxyl number of about 160 are blended with about 10 parts of tall oil having the following analysis:

| | |
|---|---|
| Rosin acids, percent | 0.5 |
| Fatty acids, percent | 99.0 |
| Unsaponifiables, percent | 0.5 |
| Saturated acids, percent | 2.2 |
| Acid number | 199 |
| Saponification No. | 199 |
| Iodine number | 134 |

Then the resulting blend is mixed with about 50 parts of a mixture of 80 percent 2,4- and 20 percent 2,6-toluylene diisocyanate, about 4.25 parts of a mixture and about 3 parts of water, about 0.45 part of triethylene diamine and about 0.8 part of an alkyl silane oxyalkylene block copolymer having the formula

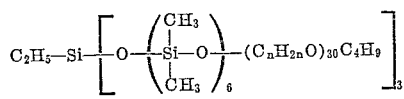

wherein $(C_nH_{2n}O)$ is a mixed polyoxyethylene and oxypropylene block copolymer containing about 17 oxyethylene units and about 13 oxypropylene units, and about 1.2 parts of a mixture of about 1 part of N-ethyl morpholine and about 0.2 part of stannous octoate on a machine mixer as disclosed in U.S. Reissue Patent 24,514. The mixture of reaction components from the machine is allowed to fall into a paper lined mold where it begins to foam after about 12 seconds. The foam has risen to its maximum height in about 85 seconds. It is then placed in an oven at about 150° F. for about 1 hour. The resulting polyurethane foam has practically no cell faces and is suitable for use as a filter without further chemical treatment. It has about 25–30 cells per linear inch and the air transmission through a ⅜ inch thickness measured on a "FRAM" tester is about 0.22 inch of water.

The foam has the following physical properties:

| | | |
|---|---|---|
| Density | lbs./ft.³ | 1.7 |
| Tensile strength | lbs./in.² | 12.7 |
| Elongation | percent | 155 |
| Compression set 6 hr. 90% | | 12.7 |
| Tear strength | lbs./in. | 1.3 |

Compression deflection (R indicates that the load was measured after one minute rest):

| | | |
|---|---|---|
| 25% | lbs./in.² | .30 |
| 25% R | lbs./in.² | .21 |
| 50% | lbs./in.² | .32 |
| 75% | lbs./in.² | .68 |

Indent (load in lbs./50 in.²; R indicates that the load was measured after one minute rest):

| | | After 24 hrs. aging at 140° C. |
|---|---|---|
| 25% | 20 | 24 |
| 25% R | 15 | 18 |
| 50% | 25 | 30 |
| 50% R | 20 | 24 |
| 65% | 36 | 43 |
| 65% R | 20 | 34 |
| 75% | 62 | 70 |
| 75% R | 47 | 54 |

When the foregoing example is repeated except that 5 parts of tall oil are used instead of 10 parts, the density remains about the same but the pressure drop on the "FRAM" tester increases to 0.32 inch of water. Using 15 parts of tall oil the reading is 0.14 inch of water.

*Example 2*

About 90 parts of castor oil are blended with about 10 parts of tall oil as used in Example 1. Then the resulting blend is mixed with about 68 parts of the mixture of toluylene diisocyanates used in Example 1 and about 6 parts of a mixture of 4.5 parts of water, 0.5 part of triethylene diamine and about 1 part of the alkyl silane oxyalkylene block copolymer used in Example 1 and about 1.2 parts of a mixture of 1 part of N-ethyl morpholine and about 0.2 part of stannous octoate on a machine mixer as described in U.S. Reissue Patent 24,514 including the use of a paper lined mold and curing in an oven at 150° F. The resulting foam has about 30–35 cells per linear inch and air transmission through a ¾ inch thickness as measured on a "FRAM" tester is about 0.29 inch of water.

The foam has the following physical properties:

| | | |
|---|---|---|
| Density | lbs./ft.³ | 1.2 |
| Tensile strength | lbs./in.² | 18.9 |
| Elongation | percent | 140 |
| Tear strength | lbs./in. | 1.7 |

Compression deflection (R indicates that the load was measured after one minute rest):

| | | |
|---|---|---|
| 25% | lbs./in.² | .48 |
| 25% R | lbs./in.² | .31 |
| 50% | lbs./in.² | .53 |
| 75% | lbs./in.² | 1.07 |

Indent (load in lbs./50 in.²; R indicates that the load was measured after one minute rest):

| | |
|---|---|
| 25% | 28 |
| 25% R | 20 |
| 50% | 35 |
| 50% R | 26 |
| 65% | 50 |
| 65% R | 37 |
| 75% | 81 |
| 75% R | 58 |

*Example 3*

About 90 parts of castor oil are blended with about 10 parts of the tall oil used in Example 1. Then the resulting blend is mixed with about 50 parts of the mixture of toluylene diisocyanates used in Example 1, about 3.9 parts of a mixture of about 3 parts of water, about 0.4 part of triethylene diamine and about 0.5 part of the alkyl silane oxyalkylene block copolymer employed in Example 1 and about 1.3 parts of a mixture of about 1 part of N-ethyl morpholine and about 0.3 part of stannous octoate by hand. The resulting foam has a skeletal structure, about 30 cells per inch and practically no cell faces. Air transmission through a ¼ inch thickness on a "FRAM" tester is about 0.29 inch of water. The resulting foam density is about 2.0 lbs./ft.³.

*Example 4*

About 100 parts of castor oil are blended with about 4.5 parts of the tall oil employed in Example 1 and then mixed with about 50 parts of the toluylene diisocyanates employed in Example 1 and about 6.1 parts of a mixture of about 4.5 parts of water, about 0.6 part of triethylene diamine, about 0.5 part of the alkyl silane oxyalkylene block copolymer employed in Example 1 and about 1 part of N-ethyl morpholine on a machine mixer as disclosed in U.S. Reissue Patent 24,514. The resulting polyurethane foam has a density of about 1.2 lbs./ft.³ and is suitable for use as a filter without further chemical treatment and a one inch thickness gives a reading of about 0.34 inch of water on the "FRAM" tester.

When the foregoing example is repeated except that the tall oil is not included, the density of the foam remains the same but pressure tests on the "FRAM" tester are much greater than 0.5 inch of water.

*Example 5*

About 90 parts of castor oil are mixed with about 10 parts of a mixture containing equal parts of haptadecyl alcohol, octadecyl alcohol and isooctyl alcohol. The resulting blend is then mixed with about 57 parts of the mixture of toluylene diisocyanates employed in Example 1, about 4.4 parts of a mixture of about 3 parts of water, about 0.4 part of triethylene diamine and about 1 part of the alkyl silane oxyalkylene block copolymer employed in Example 1 and a mixture of about 1 part of N-ethyl morpholine and about 0.2 part of stannous oleate on a machine mixer as described in U.S. Reissue Patent 24,514. The resulting cellular polyurethane foam has a density of about 2.0 lbs./ft.$^3$, practically no cell faces and is suitable for use as a filter without further chemical treatment.

A similar product not containing the mixture of heptadecyl, octadecyl and isooctyl alcohols has many cell membranes and the pressure drop measured on the "FRAM" tester is much greater than 0.5 inch of water.

*Example 6*

A mixture of about 90 parts of castor oil and about 10 parts of heptadecyl alcohol are mixed with about 50 parts of the mixture of toluylene diisocyanate employed in Example 1 and about 4.4 parts of a mixture of 3 parts of water, about 1 part of the alkyl silane oxyalkylene block copolymer employed in Example 1 and about 0.4 part of triethylene diamine and about 1.2 part of a mixture of about 1 part of N-ethyl morpholine and about 0.2 part of stannous oleate on a machine mixer as disclosed in U.S. Reissue Patent 24,514. The resulting cellular polyurethane foam has a density of about 2.0 lbs./ft.$^3$, practically no cell faces and is suitable for use as a filter without further chemical treatment.

A similar product not containing the mixture of heptadecyl alcohol has many cell membrances and the pressure drop measured on the "FRAM" tester is much greater than 0.5 inch of water.

*Example 7*

About 90 parts of castor oil are blended with about 10 parts of lauric acid. The resulting blend is then mixed with about 50 parts of the toluylene diisocyanates employed in Example 1, about 4.4 parts of a mixture of about 3 parts of water, about 1 part of the alkyl silane oxyalkylene block copolymer employed in Example 1 and about 0.4 part of triethylene diamine and about 1.2 parts of a mixture of about 1 part N-ethyl morpholine and about 0.2 part stannous oleate on a machine mixer as disclosed in U.S. Reissue Patent 24,514. The resulting cellular polyurethane foam has a density of about 2.0 lbs./ft.$^3$, practically no cell faces and is suitable for use as a filter without further chemical treatment. A one inch thickness gives a reading on the "FRAM" tester of 0.34 inch of water.

*Example 8*

About 90 parts of castor oil are blended with about 10 parts of oleic acid. The resulting blend is mixed with about 53 parts of the toluylene diisocyanates employed in Example 1, about 4.4 parts of a mixture of about 3 parts of water, about 1 part of the alkyl silane oxyalkylene block copolymer employed in Example 1 and about 0.4 part of triethylene diamine and about 1.2 parts of a mixture of about 1 part N-ethyl morpholine and about 0.2 part stannous oleate on a machine mixer as disclosed in U.S. Reissue Patent 24,514. The resulting cellular polyurethane foam has a density of about 2.0 lbs./ft.$^3$, practically no cell faces and is suitable for use as a filter without further chemical treatment. A one inch thickness gives a reading on the "FRAM" tester of 0.40 inch of water.

*Example 9*

About 90 parts of castor oil are blended with about 10 parts of acetic acid. The resulting blend is mixed with about 53 parts of the toluylene diisocyanates employed in Example 1, about 4.4 parts of a mixture of about 3 parts of water, about 1 part of the alkyl silane oxyalkylene block copolymer employed in Example 1 and about 0.4 part of triethylene diamine and about 1.2 parts of a mixture of about 1 part N-ethyl morpholine and about 0.2 part stannous oleate on a machine mixer as disclosed in U.S. Reissue Patent 24,514. The resulting polyurethane foam has a density of about 2.0 lbs./ft.$^3$, practically no cell faces and is suitable for use as a filter without further chemical treatment.

A product made without acetic acid has many cell faces. Shrinkage occurs to this control sample upon standing, making it unsuitable for use as a filter.

It is to be understood that the foregoing examples are given for the purpose of illustration and that any other suitable organic polyisocyanate, organic compound containing one hydroxyl group and the like could have been used therein with satisfactory results.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. The method of making a skeletal cellular polyurethane plastic which comprises reacting an organic polyisocyanate with castor oil in the presence of a blowing agent, an alkyl silane oxyalkylene block copolymer and from about 5 to about 40 parts per 100 parts of castor oil of a member selected from the group consisting of monohydric alcohols having 1 to 18 carbon atoms and monocarboxylic acids having 2 to 18 carbon atoms, the alcoholic hydroxyl radical and the carboxylic acid radical of said respective group members being the sole active hydrogen containing radical in the respective group members.

2. The skeletal cellular polyurethane plastic produced by the method of claim 1.

3. The method of making a skeletal cellular polyurethane plastic which comprises reacting an organic polyisocyanate with castor oil and water in the presence of an alkyl silane oxyalkylene block copolymer having the formula

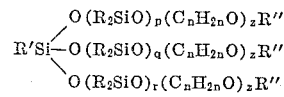

wherein R, R' and R" are alkyl radicals having 1 to 4 carbon atoms; $p$, $q$ and $r$ each have a value of from 4 to 8 and $(C_nH_{2n}O)_z$ is a mixed polyoxyethylene oxypropylene group containing about 15 to 19 oxyethylene units and from 11 to 15 oxypropylene units with $z$ equal to from about 26 to about 34, and from about 5 to about 40 parts of tall oil per hundred parts of castor oil.

4. The method of claim 3 wherein said tall oil contains at least 90 percent fatty acids.

5. The method of claim 3 wherein said alkyl silane oxyalkylene block copolymer has the formula

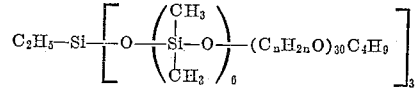

wherein $(C_nH_{2n}O)$ is a mixed polyoxyethylene and oxypropylene block copolymer containing about 17 oxyethylene units and about 13 oxypropylene units.

6. The method of claim 3 wherein from about 5 to about 15 parts of tall oil are employed per hundred parts of castor oil.

7. The method of claim 3 wherein the reaction is carried out in the presence of a tin catalyst.

8. The method of claim 3 wherein the reaction is carried out in the presence of both a tin catalyst and a tertiary amine catalyst.

9. The method of making a skeletal cellular polyurethane plastic which comprises reacting about 100 parts of a castor oil with from about 45 to about 75 parts of toluylene diisocyanate and about 3 to about 4.5 parts of water in the presence of from about 0.2 to about 15 parts of an alkyl silane oxyalkylene block copolymer having the formula

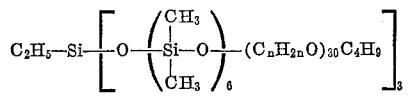

wherein $(C_nH_{2n}O)$ is a mixed polyoxethylene and oxypropylene block copolymer containing about 17 oxyethylene units and about 13 oxypropylene units, about 5 to about 15 parts of tall oil containing at least about 90 percent fatty acids, about 0.3 part to about 1.2 parts of triethylene diamine and about 0.2 to about 1.5 parts of a member selected from the group consisting of stannous octoate and stannous oleate.

10. The method of making a skeletal cellular polyurethan plastic which comprises reacting an organic polyisocyanate with castor oil in the presence of a blowing agent, an alkyl silane oxyalkylene block copolymer having the formula

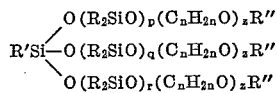

wherein R, R' and R" are alkyl radicals having 1 to 4 carbon atoms; $p$, $q$ and $r$ each have a value of from 4 to 8 and $(C_nH_{2n}O)_z$ is a mixed polyoxyethlene oxypropylene group containing from 15 to 19 oxyethylene units and from 11 to 15 oxypropylene units with $z$ equal to from about 26 to about 34, and from about 5 to about 40 parts of tall oil per hundred parts of castor oil.

11. The method of claim 10 wherein said tall oil contains at least 90 percent fatty acids.

12. The method of claim 10 wherein said alkyl silane oxyalkylene block copolymer has the formula

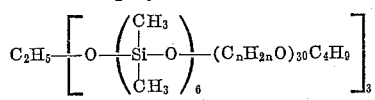

wherein $(C_nH_{2n}O)$ is a mixed polyoxyethylene and oxypropylene block copolymer containing about 17 oxyethylene units and about 13 oxypropylene units.

13. The method of claim 10 wherein from about 5 to about 15 parts of tall oil are employed per hundred parts of castor oil.

14. The method of claim 10 wherein the reaction is carried out in the presence of a tin catalyst.

15. The method of claim 10 wherein the reaction is carried out in the presence of both a tin catalyst and a tertiary amine catalyst.

16. The method of claim 10 wherein said blowing agent is a halohydrocarbon.

17. The method of claim 10 wherein said blowing agent is trichlorofluoromethane.

18. The skeletal cellular polyurethane plastic produced by the method of claim 10.

19. The method of claim 10 wherein said organic polyisocyanate is 4,4'-diphenylmethane diisocyanate.

20. The method of making a skeletal cellular polyurethane plastic which comprises reacting an organic polyisocyanate with castor oil in the presence of a blowing agent, an alkyl silane oxyalkylene block copolymer and from about 5 to about 40 parts per hundred parts of castor oil of oleic acid.

References Cited by the Examiner

UNITED STATES PATENTS

| | | | |
|---|---|---|---|
| 2,772,245 | 11/56 | Simon et al. | 260—2.5 |
| 2,956,031 | 10/60 | Khawam | 260—2.5 |
| 2,961,710 | 11/60 | Stark | 260—2.5 |

FOREIGN PATENTS

| | | |
|---|---|---|
| 852,379 | 10/60 | Great Britain. |
| 1,176,044 | 11/58 | France. |
| 1,212,252 | 10/59 | France. |

LEON J. BERCOVITZ, *Primary Examiner.*

DONALD E. CZAJA, *Examiner.*